UNITED STATES PATENT OFFICE.

FRANCIS L. STEWART, OF MURRYSVILLE, PENNSYLVANIA, ASSIGNOR OF ONE-HALF TO SAMUEL E. GILL, OF PITTSBURG, PENNSYLVANIA.

DEFECATING SACCHARINE LIQUIDS.

No. 829,678.      Specification of Letters Patent.      Patented Aug. 28, 1906.

Application filed June 19, 1905. Serial No. 266,051.

*To all whom it may concern:*

Be it known that I, FRANCIS L. STEWART, of Murrysville, Westmoreland county, Pennsylvania, have invented a new and useful Improvement in Defecating Saccharine Liquids, of which the following is a full, clear, and exact description.

This invention relates to a method of clarifying or defecating saccharine juices in the process of their manufacture into sugars and syrups; and it consists in the use of stearic acid, and preferably sulfite of magnesium introduced into the saccharine juice at such a temperature as will enable them to exercise their special effect upon the impurities in the juice—viz., the stearic acid should be introduced first when the juice has reached a temperature of not less than 150° Fahrenheit, but preferably about 180° Fahrenheit, and should be succeeded by the addition of sulfite of magnesium; so that these substances may be simultaneously present in the juices. The two substances thus used are thoroughly incorporated with the juice by agitation till it has reached the boiling temperature. For the sulfite of magnesium the sulfite of one of the other metals of the alkaline earths may be substituted. These ingredients are preferably used in about the proportions of one part, by weight, of stearic acid to three parts of the sulfite. To employ these proportions, I use one-fourth of a pound of stearic acid and three-fourths of a pound of the sulfite to about two hundred gallons of the saccharine liquid as ordinarily obtained from the stalks. The above-named proportions are those required for average conditions, the necessary amount of the defecating compound varying from one pound for one hundred gallons of juice of inferior quality to one pound for three hundred gallons of juice of the best quality. In all cases the amount of defecating compound used should be sufficient to remove the impurities and should be in proportion to the total organic matter other than sug. which is contained in the juice to be defecated, as may be ascertained by previous test. While these substances may be added separately, as above described, it is usually more convenient to use them in the form of a mixture which I prepare by taking stearic acid, either in the purified form or as associated with margaric, palmitic, or oleic acids as ordinarily obtained from fats or oils or directly from stearin, and either heat it sufficiently to liquefy it or take a hot saturated solution of it in alcohol or other solvent and mix it thoroughly by stirring with the dry crystallized or powdered sulfite, using the two ingredients in the proportion of about one part, by weight, of stearic acid to three parts of the sulfite. Before the mixture so formed has cooled it may either be molded into the form of briquets or granulated by stirring, or it may be left in the form of a solid mass of the shape of the interior of the containing vessel. This material I name "saccharifer." In any of these forms the material is in suitable condition to be used for clarifying crude saccharine juices or impure sugar solutions.

In carrying out this invention after a sufficient amount of magnesia or lime has first been mixed with the juice to neutralize the organic acid which it contains and when the liquid has been heated to a temperature of about 180° Fahrenheit the clarifying agents above described are introduced into it and used in quantities proportionate to that of the impurities present in the juice as ascertained by previous test, (as by precipitation by alcohol or subacetate of lead.) In general one pound of the mixture will be sufficient for about two hundred gallons of a juice of medium quality. The juice is then brought to the boiling temperature, the scum removed, and it is then allowed to stand at rest for a sufficient time to allow the sediment to subside, and the clear juice is then run off and evaporated to a density to produce sugar or syrup. This material when thus assisted by heat has the effect of breaking up and uniting with and rendering insoluble the impurities ordinarily found in saccharine juices or impure sugar solutions, thus defecating them at once. Before being introduced into the heated saccharine solution the substances in the compound simply constitute a mixture and have no chemical reaction upon each other, and in that form both will retain their characteristic chemical properties unchanged for any length of time, and the compound will be in a convenient condition for transportation or for immediate use.

When used under the above-described conditions, the result of the reaction of the constituents of the compound upon each other and upon the impurities commonly present in the saccharine liquid is such that when the liquid is reduced by rapid evaporation to the condition of a dense syrup or "masse-cuite" it is then cheaply and expeditiously clarified and refined, no injurious substances being left in the solution.

Within the scope of my invention, but with less beneficial result, aluminium sulfite may be substituted for magnesium sulfite.

Having thus described my invention and the manner of using same, what I claim is—

1. In the herein-described method of clarifying saccharine juices, the step which consists in causing stearic acid and the sulfite of a light metal to be simultaneously present in said juices and to act upon the same; substantially as described.

2. In the herein-described method of clarifying saccharine juices, the step which consists in causing stearic acid and the sulfite of a metal of the alkaline earths to be simultaneously present in the neutral juices and to act upon the same; substantially as described.

3. The method herein described of clarifying saccharine juices, which consists in neutralizing the contained acids, and thereafter causing stearic acid and the sulfite of a metal of the alkaline earths to be simultaneously present in said juices and to act upon the same; substantially as described.

4. The method herein described of clarifying saccharine juices, which consists in causing stearic acid and magnesium sulfite to be simultaneously present in the juices and to act upon the same, then heating the juices, and then separating them from the precipitated impurities; substantially as described.

5. The method herein described of clarifying saccharine juice, which consists in adding a mixture of stearic acid and magnesium sulfite to the heated juice, then further heating the juice to the boiling-point and then separating it from the precipitated impurities; substantially as described.

In testimony whereof I have hereunto set my hand June 16, 1905.

F. L. STEWART.

Witnesses:
THOMAS W. BAKEWELL,
H. M. CORWIN.